United States Patent [19]

Sasaki et al.

[11] 4,441,161
[45] Apr. 3, 1984

[54] PROGRAMMABLE SEQUENCE CONTROL METHOD AND DEVICES

[75] Inventors: Junichi Sasaki; Yoshihiko Okayama, both of Numazu, Japan

[73] Assignee: Toshiba Kikai Kabushiki Kaisha, Tokyo, Japan

[21] Appl. No.: 252,586

[22] Filed: Apr. 9, 1981

[30] Foreign Application Priority Data

Apr. 17, 1980 [JP] Japan ............................ 55-50713

[51] Int. Cl.³ .............................................. G06F 9/00
[52] U.S. Cl. ...................................... 364/900; 364/147
[58] Field of Search ... 364/200 MS File, 900 MS File, 364/137, 140, 141, 147

[56] References Cited

U.S. PATENT DOCUMENTS

| | | | |
|---|---|---|---|
| 4,021,783 | 5/1977 | Highberger | 364/900 |
| 4,025,902 | 5/1977 | Nakao et al. | 364/147 |
| 4,038,533 | 7/1977 | Dummermuth et al. | 364/900 |
| 4,176,403 | 11/1979 | Suzuki et al. | 364/900 |
| 4,200,914 | 4/1980 | Kintner | 364/900 |
| 4,217,658 | 8/1980 | Henry et al. | 364/147 |
| 4,227,247 | 10/1980 | Kintner | 364/147 |
| 4,244,034 | 1/1981 | Cherba | 364/147 |
| 4,249,248 | 2/1981 | Yomogida et al. | 364/900 |

*Primary Examiner*—Mark E. Nusbaum
*Assistant Examiner*—Gary V. Harkcom
*Attorney, Agent, or Firm*—Koda and Androlia

[57] ABSTRACT

A programmable sequence control apparatus including a first memory device for storing sequence program instructions, an input/output device, a relay ladder operation device for executing logic operations for a relay ladder circuit having n rows and m columns (wherein n and m are positive integers) in accordance with the program instructions, and a control device for delivering control signals to the relay ladder operation device, is so constructed that the control device includes a memory device for storing contact data and branch data for one column j (wherein $j = 1, 2, \ldots, m$) of the relay ladder circuit temporarily, the relay ladder operation device includes first and second registers of a series-in and parallel-out mode which receive and store the contact data and the branch data for the column j, respectively, a third register normally operable in a parallel-in and parallel-out mode, and a gate circuit including logic elements for executing logic operations for the column j based on the parallel delivered outputs of the first and second registers and a third register storing the operation results for the preceding column $(j-1)$, and the relay ladder operation device repeats the aforementioned operation for all of the columns of the relay ladder circuit.

3 Claims, 18 Drawing Figures

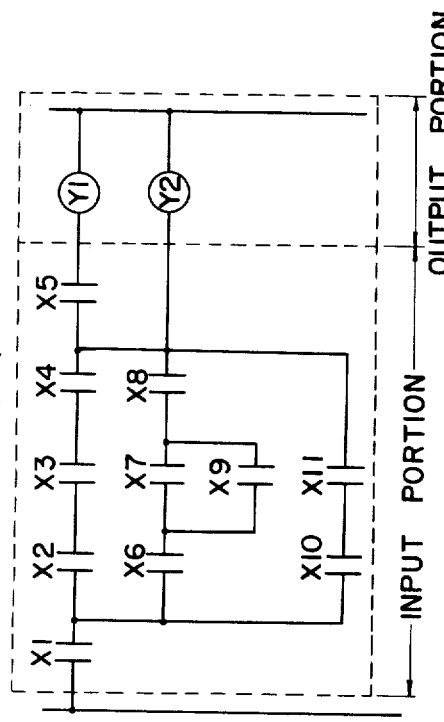
FIG.4(b)
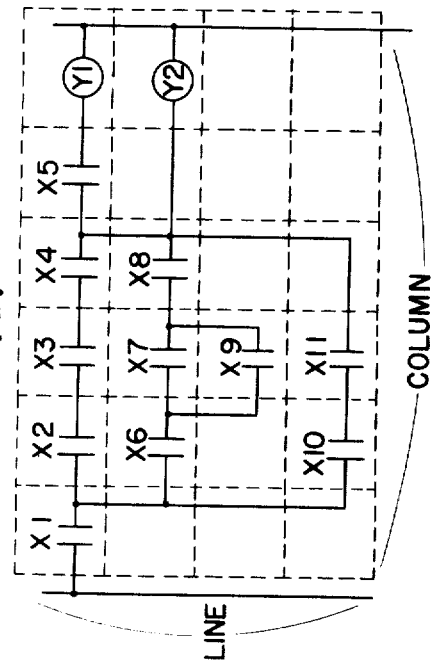
FIG.4(a)
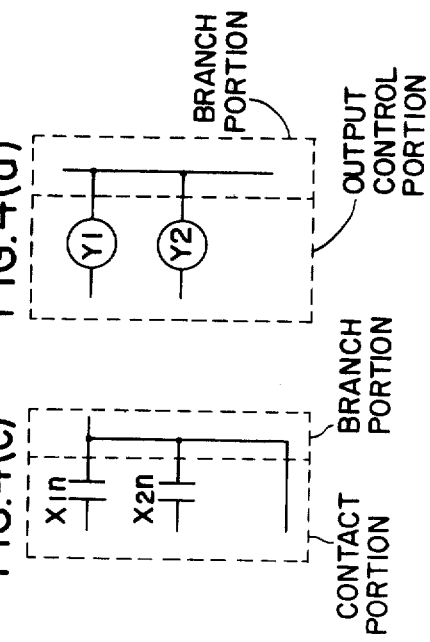
FIG.4(c)
FIG.4(d)
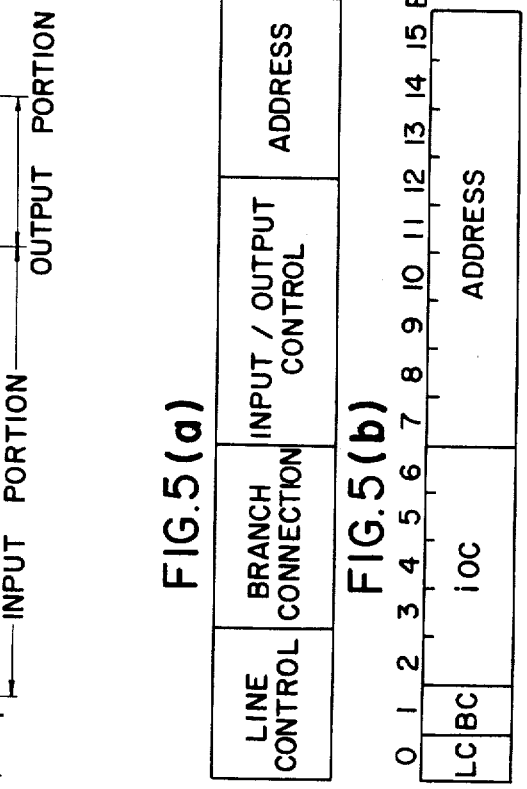
FIG.5(a)
FIG.5(b)

FIG. 6

| NO. | BIT 2 3 4 5 6 | FUNCTION |
|---|---|---|
| 0 | 0 0 0 0 0 | A CONTACT FOR GENERAL INPUTS |
| 1 | 0 0 0 0 1 | A CONTACT FOR COUNTER AND TIMER INPUTS |
| 2 | 0 0 0 1 0 | A CONTACT FOR LATCH AND DUMMY INPUTS |
| 3 | 0 0 0 1 1 | UNCONDITIONALY OFF |
| 4 | 0 0 1 0 0 | B CONTACT FOR GENERAL INPUTS |
| 5 | 0 0 1 0 1 | B CONTACT FOR COUNTER AND TIMER INPUTS |
| 6 | 0 0 1 1 0 | B CONTACT FOR LATCH AND DUMMY INPUTS |
| 7 | 0 0 1 1 1 | UNCONDITIONALY ON |
| 8 | 0 1 0 0 0 | ÷ |
| 9 | 0 1 0 0 1 | × |
| 10 | 0 1 0 1 0 | − |
| 11 | 0 1 0 1 1 | + |
| 12 | 0 1 1 0 0 | → (MOVE) |
| 13 | 0 1 1 0 1 | > |
| 14 | 0 1 1 1 0 | < |
| 15 | 0 1 1 1 1 | = |
| 16 | 1 0 0 0 0 | GENERAL OUTPUT (I/O) |
| 17 | 1 0 0 0 1 | TIMER OUTPUT (TON) |
| 18 | 1 0 0 1 0 | INTEGRATED TIMER OUTPUT (RTO) |
| 19 | 1 0 0 1 1 | UP COUNTER OUTPUT (CTU) |
| 20 | 1 0 1 0 0 | DOWN COUNTER OUTPUT (CTD) |
| 21 | 1 0 1 0 1 | LATCH OUTPUT (L) |
| 22 | 1 0 1 1 0 | DUMMY OUTPUT (R) |
| 23 | 1 0 1 1 1 | ADDITIONAL FUNCTION (BY USER) |
| 24 | 1 1 0 0 0 | ADDITIONAL FUNCTION (BY USER) |
| 25 | 1 1 0 0 1 | ADDITIONAL FUNCTION (BY USER) |
| 26 | 1 1 0 1 0 | INTEGRATED TIMER RESET OUTPUT (↓) |
| 27 | 1 1 0 1 1 | UP COUNTER RESET (↓) |
| 28 | 1 1 1 0 0 | DOWN COUNTER RESET OUTPUT (↓) |
| 29 | 1 1 1 0 1 | UNLATCH OUTPUT (↓) |
| 30 | 1 1 1 1 0 | NOP |
| 31 | 1 1 1 1 1 | CONSTANT (K) |

NOTE : A REPRESENTS NORMALLY-OPENED CONTACT
B REPRESENTS NORMALLY-CLOSED CONTACT

FIG. 7

| SYMBOL | CONTENTS | SYMBOL | CONTENTS |
|---|---|---|---|
| 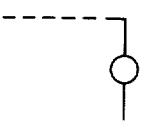 | CONTACT UNCONDITIONALLY OFF WITH NO BRANCH CONNECTION | 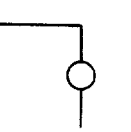 | CONTACT UNCONDITIONALLY ON WITH NO BRANCH CONNECTION |
| 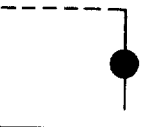 | CONTACT UNCONDITIONALLY OFF WITH BRANCH CONNECTION | 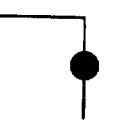 | CONTACT UNCONDITIONALLY ON WITH BRANCH CONNECTION |
| 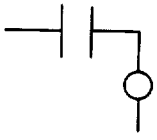 | NORMALLY OPENED CONTACT WITH NO BRANCH CONNECTION | 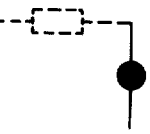 | NO OUTPUT WITH BRANCH CONNECTION |
| 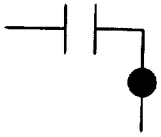 | NORMALLY OPENED CONTACT WITH BRANCH CONNECTION | 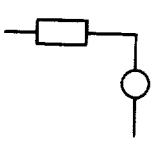 | OUTPUT WITH NO BRANCH CONNECTION (ONE CIRCUIT END) |
| 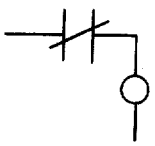 | NORMALLY CLOSED CONTACT WITH NO BRANCH CONNECTION | 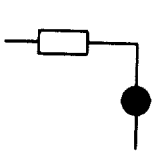 | OUTPUT WITH BRANCH CONNECTION |
| 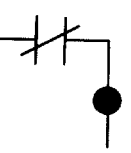 | NORMALLY CLOSED CONTACT WITH BRANCH CONNECTION | ( )+( )=( )<br>( )÷( )=( )<br>( )×( )=( )<br>( )−( )=( )<br>( )→( )<br>( )>( )<br>( )<( )<br>( )=( ) | ARITHMETIC OPERATION |

| CONVENTIONAL METHOD | | METHOD OF THE INVENTION | |
|---|---|---|---|
| SET | X1 | ─┤├─•  | X1 |
| SET | X2 | END ─ ─ ─ ─• | |
| AND | X3 | ─┤├─○ | X2 |
| OR | X4 | ─┤├─○ | X4 |
| SET | X5 | END ─┤├─○ | X5 |
| AND | X6 | ─┤├─• | X3 |
| OR SET | | ─┤├─• | |
| AND SET | | END ─┤├─○ | X6 |
| OUT | Y12 | END ─▭─ | Y12 |

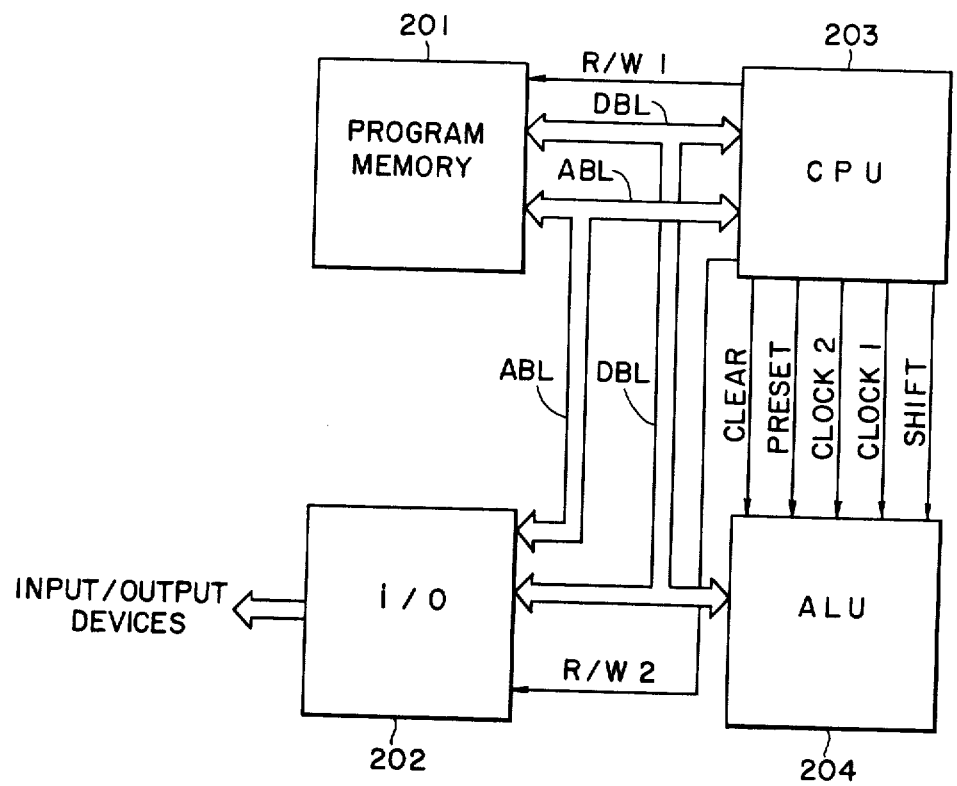
F I G. 12

PROGRAMMABLE SEQUENCE CONTROL METHOD AND DEVICES

BACKGROUND OF THE INVENTION

This invention relates to programmable sequence control method and apparatus, and more particularly to a type thereof utilizing a column cyclic operation.

Control apparatus including complicated relay systems known as relay ladder circuits have been well known. In these apparatus when one part of the relay ladder circuit is required to be altered, various parts associated therewith must be also altered, rendering the alteration to be extremely troublesome.

In order to eliminate the above described difficulties, programmable sequence control apparatus have been heretofore developed. In this kind of control apparatus, the relay ladder circuit in the form of hardware is not utilized any more, but a sequence control program is stored therein in the form of software.

The control methods used in recent programmable sequence controllers can be classified into two groups, one being a method for controlling the sequence of operation in accordance with the Polish notation of Boolean formulae, and the other being a method for controlling each relay sequence by a jumping instruction as disclosed in the Japanese Laid-Open Patent Specification No. 152174/1975.

The methods will now be described in detail with respect to a relay circuit shown in FIG. 1.

According to the first method utilizing Boolean formulae, a program for obtaining the logic sum Y1 of two values, one being a logic product of the data regarding contacts i1 and i2, and the other being a logic product of the data regarding contacts i3 and i4, includes the following instructions.

(1) Load an accumulator with i1,
(2) Obtain logic product of i2 and the contents of the accumulator,
(3) Shift the logical product obtained by the accumulator into a memory device,
(4) Load the accumulator with i3,
(5) Obtain a logic product between the contents of the accumulator and i4,
(6) Provide a logic sum of the logic product stored in the memory device and the contents of the accumulator, and
(7) Deliver the logic sum to the output Y1.

On the other hand, a program used in the second method utilizing jumping instructions includes the following instructions.

(1) Load an accumulator with i1,
(2) Obtain a logic product of i2 and the content of the accumulator,
(3) Jump to the following step (9) if the logic product satisfies a condition (ON),
(4) Load the accumulator with i3,
(5) Calculate a logic product of i4 and the contents of the accumulator,
(6) Jump to the step (9) if the logic product satisfies a condition (ON),
(7) Stop the output (when the condition is not satisfied),
(8) Jump to step (10) without any condition,
(9) Produce the output, and
(10) Shift operation to another relay ladder circuit.

As is apparent from the above description, the programs used in the two methods must be prepared by carefully observing the relay ladder circuit and considering the sequence in executing the instructions. This means that the preparation, compiling and correction of the programs are complicated because of the complexity of the relay ladder circuit.

SUMMARY OF THE INVENTION

The object of the present invention is to provide a programmable sequence control device including a novel operational portion which utilizes a novel concept of a switch matrix for the preparation and execution of a program concerning a relay ladder circuit.

According to one aspect of the present invention, there is provided a method for calculating with a programmable sequence control apparatus a resultant condition of a relay ladder circuit having n rows and m columns (n and m are integers), the condition being caused by opening and closing of each contact of the relay ladder circuit, the apparatus comprising a memory device for storing sequence program instructions, an input/output device introducing input data relating to the contacts, a ladder operation device, and a control device, the method comprising the steps of fetching under the control of the control device, contact data for a column of the relay ladder circuit from the memory device and the input/output device into a first memory device in the ladder operation device, fetching under the control of the control device, branch data for the same column of the relay ladder circuit from the memory device into a second memory device in the ladder operation device, executing logic operations on the contact data and the branch data for the same column, starting from a first row to a last row, so that operational results are stored in a third memory device in the ladder operation device, and repeating the logic operations for all of the remaining columns until the operational results for the last column of the relay ladder circuit is obtained in the third memory device.

According to another aspect of the invention, there is provided a programmable sequence control apparatus comprising a memory device for storing sequence program instructions, an input/output device for introducing input data and delivering output data therethrough, a ladder operation device for executing logic operations for a ladder circuit having n rows and m columns (n and m are integers) in accordance with the program instructions, and a control device for delivering control signals to the ladder operation device, the ladder operation device comprising a first memory device for storing contact data for the ladder circuit, a second memory device for storing branch data for the ladder circuit, a third memory device for setting logic "1" at an initiation of the logic operation, and a gate device for executing logic operation on each column of the ladder circuit in response to the outputs of the first and second memory devices with reference to the output of the third memory device, and delivering the results to the third memory device, whereby the ladder operation device is operable in response to the control signals delivered from the control device to carry out the logic operations successively starting from a first column to a last column of the ladder circuit.

The invention will now be described in more detail with reference to the accompanying drawings.

BRIEF DESCRIPTION OF THE DRAWINGS

In the accompanying drawings:

FIG. 4a is a diagram wherein a relay ladder circuit is divided into matrix elements;

FIG. 4b is a diagram wherein the switch matrix shown in FIG. 4a is divided into an input portion and an output portion;

FIG. 4c is a diagram showing one part of the input portion of the switch matrix, which is further divided into a contact portion and a branch portion;

FIG. 4d is a diagram showing one part of the output portion of the switch matrix, which is further divided into an output control portion and a branch portion;

FIG. 5a is a diagram showing an ordinary construction of program instruction words required for carrying out the present invention;

FIG. 5b shows an example wherein each of the instruction words is composed of 16 bits;

FIG. 6 is a table showing bit constructions and functions of various input/output control data;

FIG. 7 shows various symbols for representing various instruction words;

FIG. 8a shows another example of a relay ladder circuit;

FIG. 8b is a comparison table of conventional programming processing and that of the present invention to be used for the relay ladder circuit shown in FIG. 8a;

FIG. 12 is a block diagram showing entire operations of the sequence control apparatus.

DESCRIPTION OF THE PREFERRED EMBODIMENT

A basic principle of the present invention will firstly be described.

Figure 1:
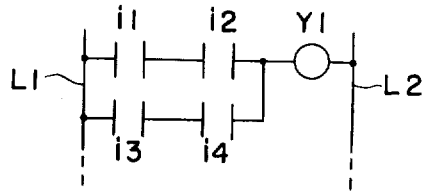
FIGS. 1 and 2 are examples of well known relay ladder circuits.
Figure 2:
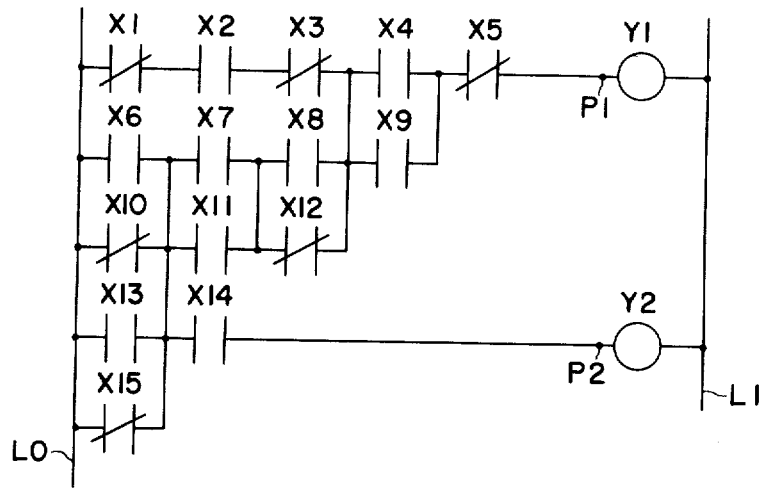

FIG. 2 shows an example of a relay ladder circuit. In this circuit, X1 through X15 designate relay contacts (normally open or normally closed), and Y1 and Y2 designate output devices which are energized when the potentials at positions P1 and P2 are made to be equal to the potential of a line L0.

Figure 3:
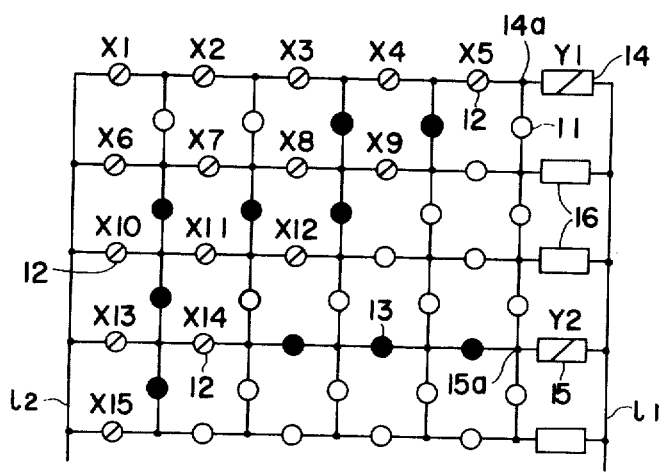
FIG. 3 is a switch matrix corresponding to the ladder circuit shown in FIG. 2.

In FIG. 3 there is indicated a network in the form of a matrix which simulates the relay ladder circuit shown in FIG. 2. In FIG. 3, blank circles 11 represent switches always held in OFF state, slashed circles 12 represent switches corresponding to relay contacts, and black circles 13 represent switches always held in ON state.

Likewise, slashed squares 14 and 15 represent detectors corresponding to the output devices Y1 and Y2 respectively, and blank squares 16 represent detectors always held in OFF state. The detectors represented by the slashed squares 14 and 15 are in ON state when the potentials of positions 14a and 15a are brought to the potential of a power line 12.

Comparing FIG. 2 with FIG. 3, it is apparent that a practical relay ladder circuit shown in FIG. 2 can be represented by a matrix-form network of FIG. 3 having switches as described above at positions corresponding to those of the matrix elements.

Thus, by considering a switch network of a matrix form (hereinafter termed switch matrix) wherein switches are arranged in a two-dimensional form as shown in FIG. 3, the above described complicated procedures in providing sequence programs for the relay ladder circuit of FIG. 2 can be eliminated entirely. More specifically, the condition of the output devices Y1 and Y2 can be determined by the use of ON-OFF data of the contacts which are represented by slashed circles 12 in the switch matrix as shown in FIG. 3. Since the logical operation of the switch matrix utilized in this invention is executed by a logic operation circuit in the form of hardware, the aforementioned repeated execution of numerous instructions in the conventional procedures becomes utterly unnecessary.

FIGS. 4a through 4d are diagrams useful for explaining the logic operation of this invention.

In FIG. 4a, it is shown that a relay ladder circuit, constituted by normally open contacts X1 through X11 and output devices Y1 and Y2, is divided as shown by broken rows into matrix elements of four lines and six columns. FIG. 4b shows that the same relay ladder circuit is divided into an input portion and an output portion as indicated by broken lines. FIG. 4c shows that a part of nth column included in the input portion of FIG. 4b is further divided into a contact portion and a branch portion as shown by broken lines. FIG. 4d shows that a part of the last column corresponding to the output portion in FIG. 4b is further divided into an output control portion and a branch portion.

Supposing that the input portion shown in FIG. 4b has m rows and n columns (m and n are integers), the logic operation to be executed for a contact Xm,n in FIG. 4c included in the input portion shown in FIG. 4b will be either one of the following 5 patterns.

(1) Calculate a logic product between Xm,n and the operation result for Xm,(n-1), (2) Calculate a logic product of an inversion of Xm,n and the operation result for Xm,(n-1), (3) Use the operation result of Xm,(n-1) as it is (where Xm,n is permanently ON), (4) The operation result for Xm,n becomes OFF (where Xm,n is permanently OFF), and (5) Use any other operation result (according to the nature of Xm,n).

Where temporary memory devices such as flip-flops or registers are provided for the rows respectively, the logic operations for the contacts in the nth column are carried out in either one of the above described patterns between the same contacts and the contents of the temporary memory devices corresponding to the operation results for the contacts in the (n−1)th column, respectively.

Where the contacts in the nth column have no branch connections, the operation results for the same column are stored in the memory devices at positions where the operation results for the (n−1)th column have been stored. Conversely, where any one of the contacts in the nth column has branch connection with adjacent contact or contacts in the same column, a logic sum is obtained between the logic operation result for the specific contact and those of the adjacent contact or contacts, and the operation result for the specific contact is replaced by the logic sum. The above described operation is repeated for all of the contacts in the nth column and for all columns until the logic operation for the entire input portion of the switch matrix is completed.

Before initiation of the logic operation for the same portion, the contents of the temporary memory devices for m rows are all set at a logic value "1".

The output portion of the switch matrix will now be described.

The operation of the output portion can be classified into the following seven patterns.

(1) Ordinary output (the contents of the temporary memory device are delivered as the output of this portion),
(2) Timer output (timers are operated by the contents of the temporary memory device),
(3) Counter output (counters are operated by the contents of the same memory device),
(4) Latching output (latches are operated by the contents of the same memory device),
(5) Unlatching output (unlatching operation is carried out by the contents of the memory device),
(6) Reset output (resetting operation is carried out based on the same contents), and
(7) Dummy output (the same contents are delivered as dummy outputs).

The output portion is operated after the completion of the logic operation for the input portion in accordance with the ON-OFF data stored in the temporary memory devices, and the operation pattern of the output portion.

When there are provided a plurality of relay ladder circuits, the operation of the sequence control apparatus is then transferred to another relay ladder circuit to be processed thereafter.

An ordinary instruction word to be used in the present invention is shown in FIG. 5(a). Data to be contained in the instruction word for executing the operation of this invention are as follows.

(a) Numbers of rows and columns of the switch matrix representing a relay ladder circuit,
(b) ON-OFF conditions of branching switches included in the switch matrix,
(c) Kinds of the input and output contacts included in the switch matrix, and
(d) Addresses of the input and output contacts.

In order to contain these data, the instruction word is divided into four parts as shown in FIG. 5a. The first part indicates the location of a switch in the two-dimensional switch matrix, the second part indicates ON-OFF condition of a branching switch, the third "INPUT-/OUTPUT CONTROL PART" indicates the kind of the input and the output, and the fourth "ADDRESS PART" indicates the addresses of the input and the output.

One example of the instruction word comprising 16 bits is shown in FIG. 5b. In this example, the position indicating part at the 0th bit, designated by LC (LINE CONTROL), indicates whether the contact is the last contact in a column or not. The second part at the first bit, designated by BC (BRANCH CONTROL) indicates whether the branching condition is ON (BC is "1") or OFF (BC is "0"). The third part extending from the 2nd bit to the sixth bit and designated by "iOC" stores i/o control data as shown in FIG. 6.

In FIG. 6, control data of from No. 0 to No. 31 are indicated together with the 5 bit-codes. Among the control data (or functions), those designated by symbols $>$, $<$, $=$ at No. 13, 14, and 15 may be used as a control data for a contact such as X11 in FIG. 4b. For instance when $>$ means $P1<P2$, two instruction words as shown in FIG. 5b are prepared, the first word including the address of P1 and the control data 01110 in "ADDRESS" and "iOC" respectively, while the second word including the address of P2 in "ADDRESS" portion of the same word. In this case, the contents of "LC", "BC", and "iOC" in the second word are neglected when these words are processed in the apparatus. The four fundamental arithmetic operations and move operation shown at No. 8 to No. 12 in FIG. 6 may be used for the output portion of FIG. 4b. The instruction words for these operations are prepared as described above utilizing two words. The fourth part extending from the 7th bit to the 15th bit and designated by "ADDRESS" indicates the address (from 0 to 511) of the contact to which the instruction word is directed.

FIG. 7 shows various symbols and the contents of the control data indicated by the symbols. These symbols are used for writing the control data in the instruction word in a simple manner.

Figures 8A, 8B:
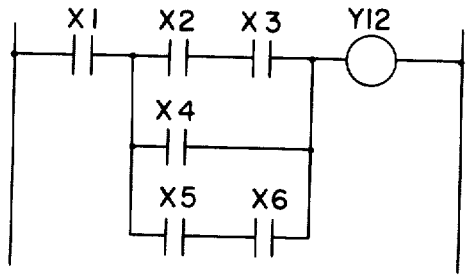

FIG. 8a indicates a relay ladder circuit, and FIG. 8b indicates how a program corresponding to the relay ladder circuit is prepared by the conventional method and the present invention. The term "END" used herein shows that a column in the ladder circuit including the contact ends at that position. It is apparent from FIG. 8b that, according to the present invention, the programming of the relay ladder circuit shown in FIG. 8a can be executed in a sequence inputting the first column starting from the first row to the last row, and then the second column starting from the first row to the last row, and then inputting the third column starting from the first row to the last row, and so on. Thus, the programming of the relay ladder circuit can be executed utterly mechanically while observing the relay ladder circuit.

Figure 9:
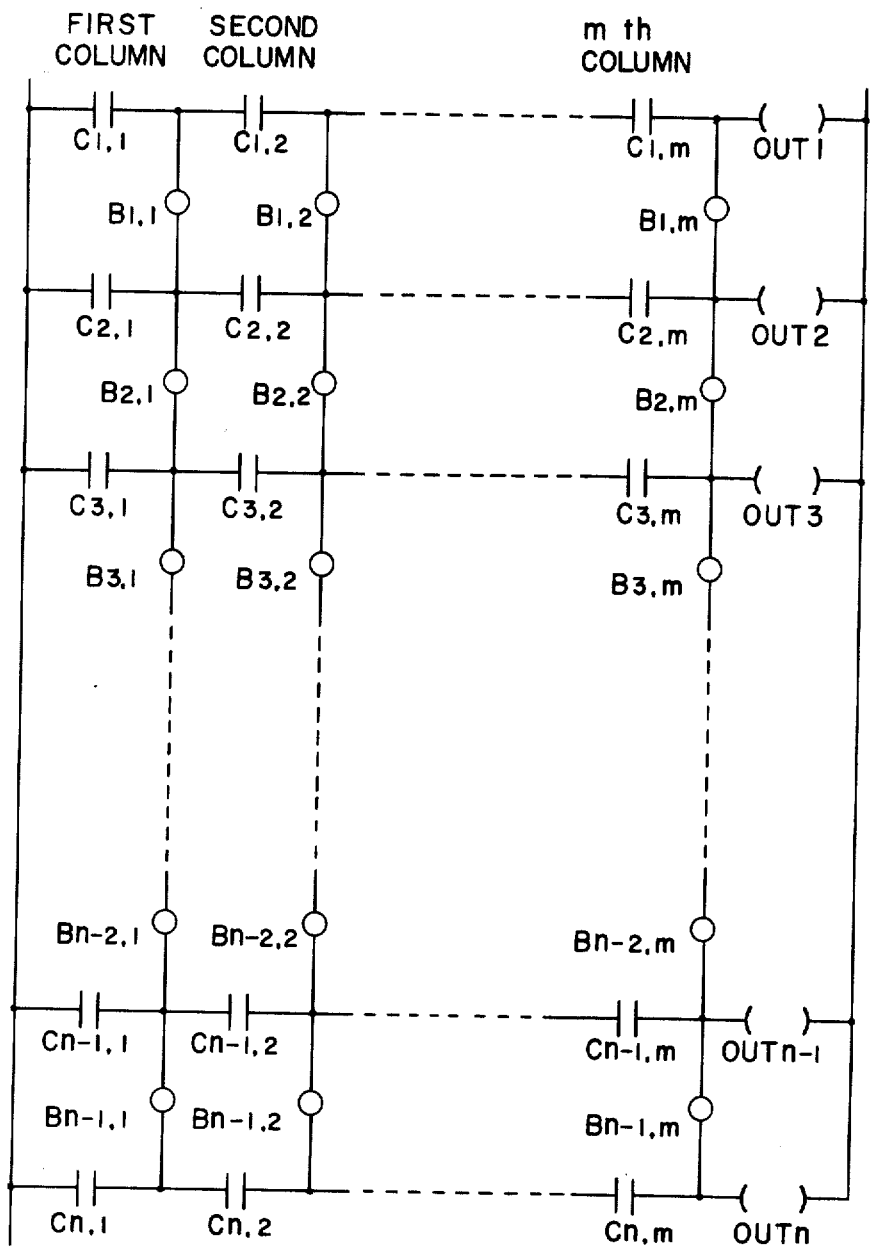
FIG. 9 is a diagram showing an ordinary relay ladder circuit wherein contact data and branch data are represented in a generalized form.

FIG. 9 shows an ordinary relay ladder circuit having n rows and m columns, wherein contact data and branch data are designated by Cij and Bij respectively (i = 1, 2, . . . n; and j = 1, 2, . . . , m).

Figure 10:
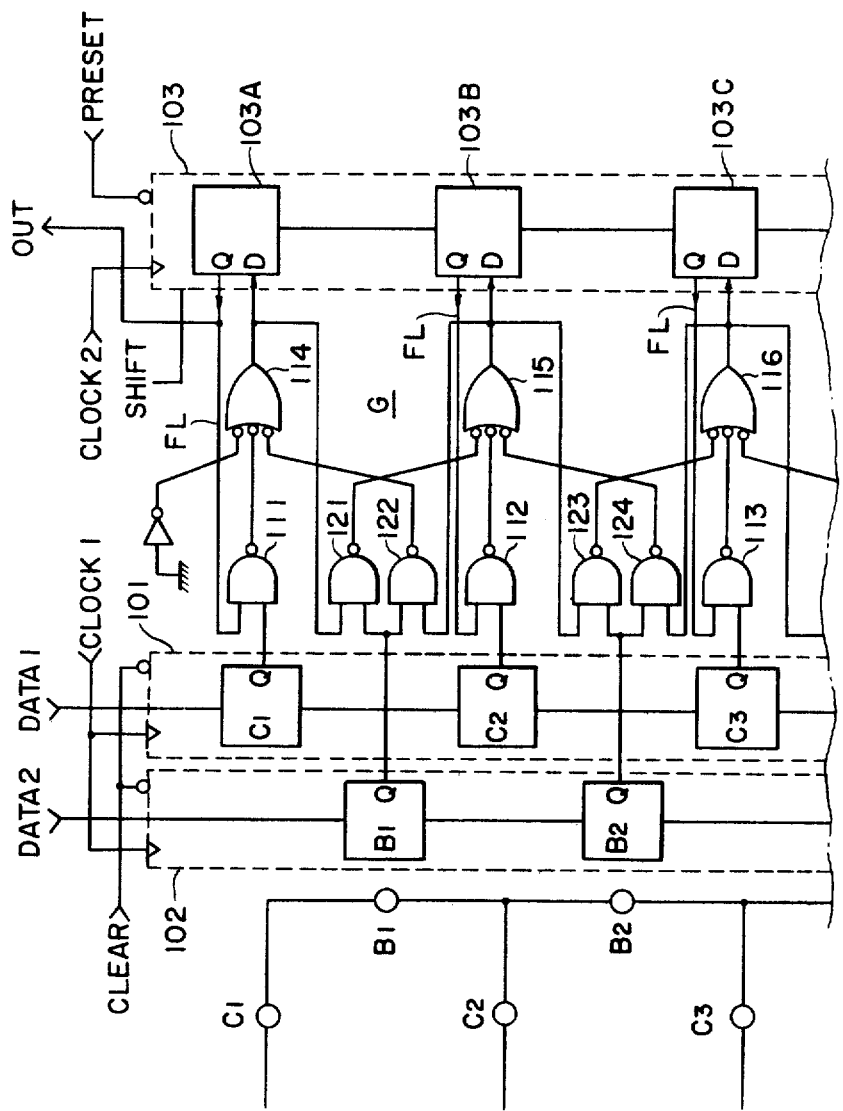
FIG. 10 is a circuit diagram showing a logic operation circuit of a sequence control apparatus according to the present invention.

FIG. 10 shows a preferred example of the logic operation circuit in the form of hardware. In FIG. 10, there is provided a shift register 101 which receives, through an input line (DATA 1), contact data such as C1j, C2j, C3j, . . . , Cnj related to a column j in the input portion of a switch matrix having n rows and m columns. More accurately, the contact data are received in the order of Cnj, C(n−1)j, . . . , C3j, C2j, and C1j. Another shift register 102 is also provided for receiving the branch data which are introduced thereto through an input line (DATA 2) in the order of Bnj, B(n−1)j, . . . , B3j, B2j, and B1j. In FIG. 10, the positions corresponding to the data B1, B2, C1, C2, and C3 in the switch matrix are shown at a lefthand part thereof.

The aforementioned contact data and branch data are received in the shift registers 101 and 102 by the timing action of a clock pulse CLOCK 1. After all the contact data and branch data for a column j have been received in the shift registers 101 and 102, respectively, logic operations are executed on these data in a gate circuit G, and the output of the gate circuit G is latched in an output register 103 in accordance with CLOCK 2. The output register 103 is of a construction normally operable in a parallel input/parallel output mode or latch mode, and is operable in a shift mode only when a SHIFT signal is received. In the parallel input/parallel output operation of the output register 103, the latched contents are fedback to one inputs of the NAND gate circuits 111, 112, 113, . . . through feedback lines FL, respectively.

Thus, when the contact data and the branch data for the next column j+1, that is Cn,j+1, Cn−1,j+1, ..., C2,j+1, C1,j+1, and Bn,j+1, Bn−1,j+1, ... B2,j+1, B1,j+1 are received in the input registers 101 and 102, the outputs of the gate circuit G corresponding to the resultant data are latched in the output register 103 by the timing action of the CLOCK 2.

The same operation is repeated a number of times corresponding to the number of columns in the switch matrix, so that a series of final outputs are stored in the output register 103. When a SHIFT signal is applied to the output register 103, the operation of the same is transferred to the shift mode so that the resultant outputs are delivered by the timing action of the CLOCK 2. A signal PRESET is applied to the output register 103 for presetting the output Q of the registers 103A, 103B, ... included in the output register 103 to logic "1" corresponding to the line 12 in FIG. 3. Furthermore, a signal CLEAR is applied to the input registers 101 and 102 prior to the reception of the input data for each column so that the contents of the input registers 101 and 102 are cleared.

The gate circuit G comprises NOR gate circuits 114, 115, 116, ..., and NAND gate circuits 111, 112, 113, . .., 121, 122, 123, .... The outputs of the NAND gate circuits 111 receiving the contact data for the first row and of the NAND gate circuit 122 receiving the branch data for the first row are inverted and then applied to the input terminals of the NOR gate circuit 114 provided for processing the first row of the switch matrix. The output of the NOR gate circuit 114 is applied to the input terminal D of the register 103A and is fedback to one input of the NAND gate circuit 121.

Likewise, the outputs of the NAND gate circuits 112 receiving the contact data for the 2nd row and the NAND gate circuits 121 and 124 receiving the branch data for the first row and the second row, respectively, are inverted and then applied to the input terminals of the NOR gate circuit 115 provided for processing the 2nd row of the switch matrix. The output of the NOR gate circuit 115 is applied to the input D of the register 103B and also to one input of the NAND gate circuit 123.

NAND gate circuits receiving the contact data for the third row and the NAND gate cricuits receiving the branch data for the second row and third row, respectively, are inverted and then applied to the input terminals of the NOR gate circuit 116 provided for processing the third row of the switch matrix.

Other NOR gate circuits 117, 118, ... and NAND gate circuits 114, ..., and 124, 125, ... provided in the gate circuit G are also connected in the same manner as described above. It should be noted that the first input of the NOR gate 114 for processing the first row of matrix is permanently connected through an inverter to the ground because there is no branch connection in front of the first row.

Figure 11:
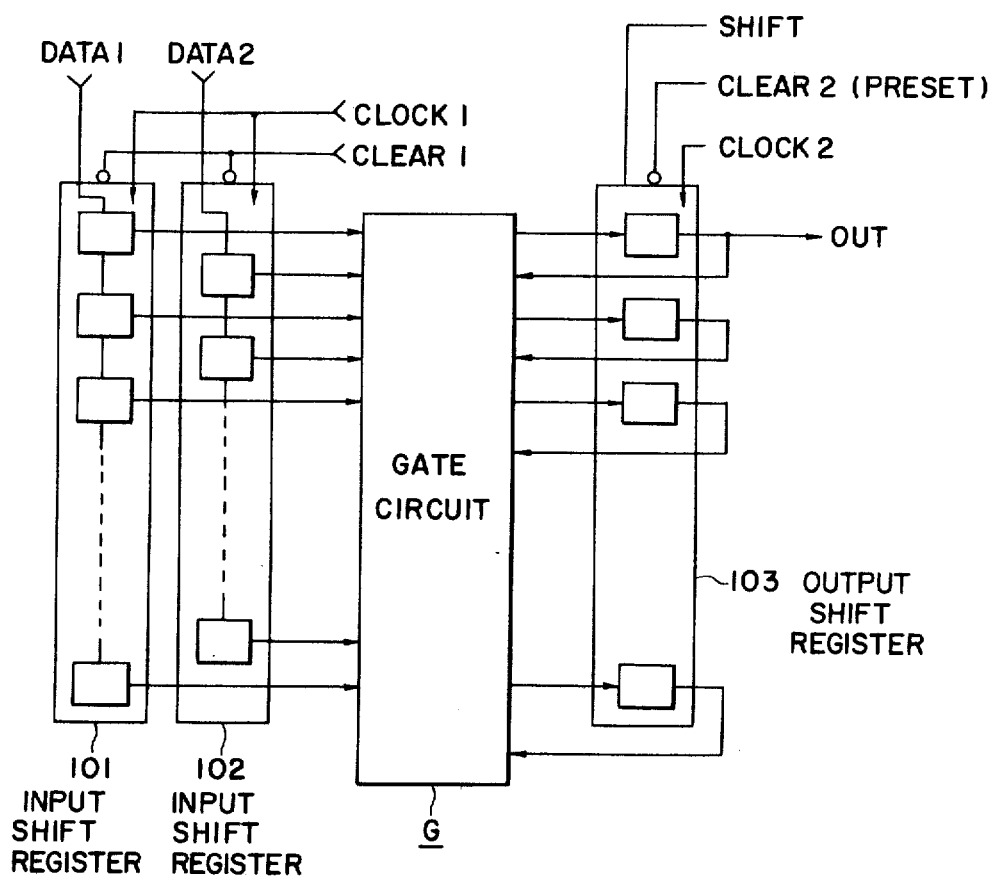
FIG. 11 is a block diagram showing the logic operation circuit in a more simplified form.

FIG. 11 is a simplified block diagram showing the logic operation circuit shown in FIG. 10.

FIG. 12 is a block diagram showing the entire construction of the sequence control apparatus according to the present invention. The apparatus comprises a program memory device 201, an input/output (i/o) device 202, a control device (CPU) 203, and an arithmetic logic operation device (ALU) 204. The program memory device 201 stores sequence programs, while the input/output device 202 is connected to various input/output elements such as sensors, output coils and the like. Addresses are assigned to the input/output elements so that these elements can be designated by selecting these addresses. In the input/output device 202, there is provided a memory area for storing the addresses and the logic conditions or the like of the input/output elements which are periodically designated. The control device (CPU) 203 controls the operation of the entire sequence control apparatus of this invention, and also is capable of altering the sequence programs and monitoring the operation.

The arithmetic and logic operation device (ALU) 204 executes logic operation as described with reference to FIG. 10. Control signals such as CLEAR, PRESET, CLOCK 1, CLOCK 2, and SHIFT are supplied from the control device 203 to the ALU 204. Contact data DATA 1 and branch data DATA 2 are read out from i/o 202 and program memory device 201 through data bus DBL, and are delivered to ALU 204, R/W 1 and R/W 2 designate READ/WRITE signals, and whether the signals are used for reading or writing is instructed each time by the control device 203.

The operation of the sequence control apparatus shown in FIG. 12 will now be described.

At first, the control device 203 delivers a reading signal R/W 1 to the program memory device 201. Then, the device 201 sends out the data words through a data bus line DBL to the control device (CPU) 203. CPU 203 interprets the data, and when the data are instruction words for the ladder operation, transforms the signal R/W 2 into read state and sends the address assigned to the instruction word through an address bus line ABL to the input/output device 202. The CPU 203 further sends the contact data DATA 1 and the branch data DATA 2 temporarily stored therein to ALU 204 in synchronism with the clock pulse CLOCK 1. The operations executed thereafter in ALU 204 are identical to that described hereinbefore.

In a case where the instruction word read out from the memory device 201 is a general output instruction (such as exciting output for a relay coil), the operation result of ALU 204 is temporarily stored in the CPU 203 by signals such as SHIFT, CLOCK 2, ADDRESS, R/W 2, and then delivered to the input/output device 202. However, in a case where the instruction word indicates an operation of, for instance, a timer, counter, latch, dummy, reset, or an arithmetic operation, a process is executed in CPU 203 for the signal, and the results thereof are set in a memory device.

In still another case where a timer, counter, dummy, or latch is included in the ladder circuit, CPU 203 sends the data to ALU 204 in consideration of the contents of the memory device.

In the above description, although it was assumed that a memory area is provided in the input/output device 202 for storing the contact data DATA 1 and the like, the memory device 201 may also be so constructed that it includes in addition to the above described area for storing programs for the sequence operation of the apparatus, a temporary memory area for storing the contact data and the like. The temporary memory area provided in the memory device 201 can be used for temporarily storing the operational results executed in CPU 204.

Figure 13:
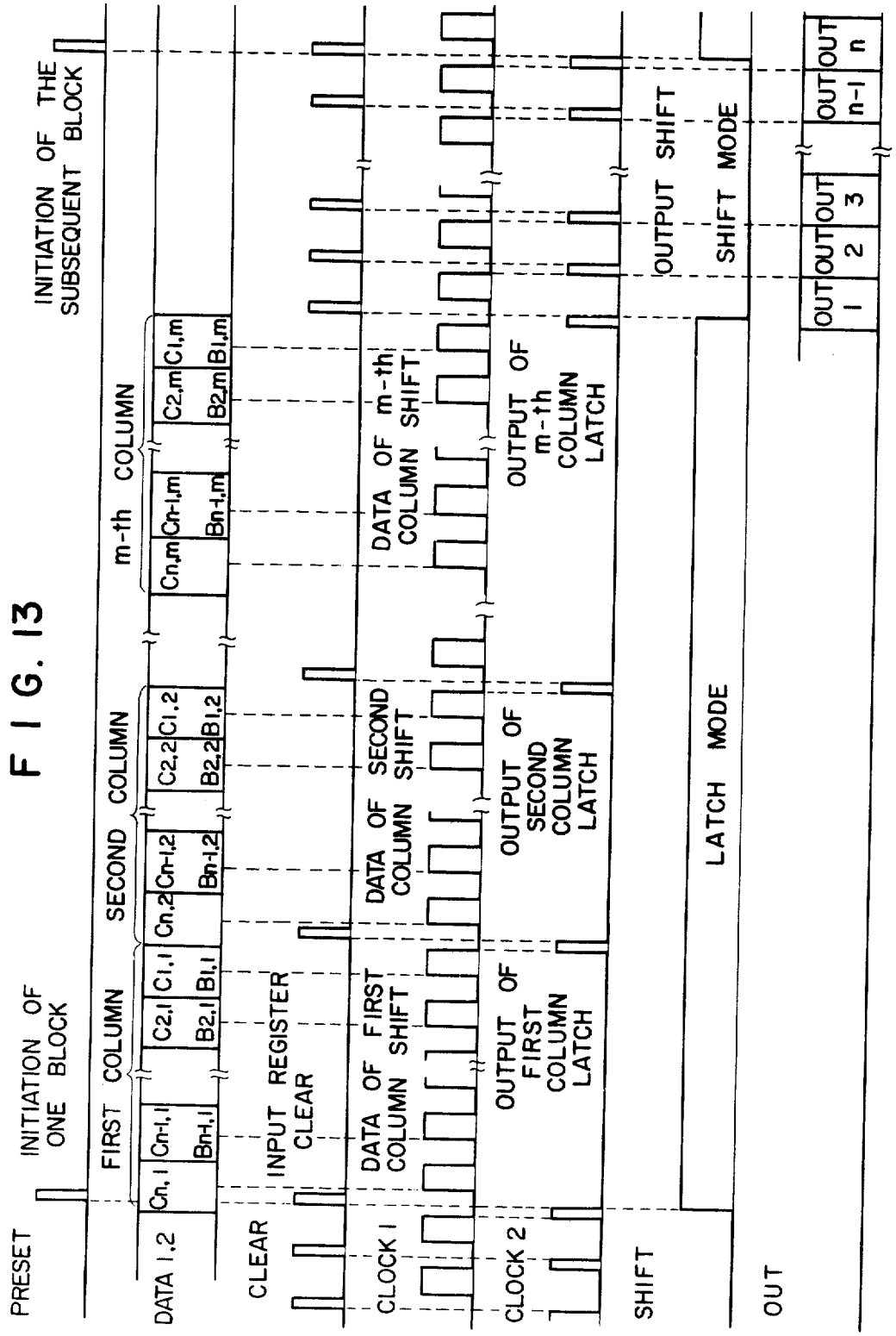
FIG. 13 is a timing chart of various signals obtained in the logic operation circuit.

FIG. 13 shows a timing chart for explaining the logic operation executed in ALU 204. As shown, the signal PRESET initiates the operation of the logic operation circuit (FIG. 10) for a relay ladder circuit in synchronism with the signal CLEAR.

By the timing action of CLOCK 1, the contact data and the branch data for the first column are introduced into the shift registers 101 and 102. The results of the logic operation are then latched in the parts of the output register 103, corresponding to respective rows in the column, by the timing action of CLOCK 2, and held in the parts for use in the logic operation for the subsequent column. The same operation is repeated for the subsequent columns, starting from the second column to the mth column, while the output register 103 is held in the latch mode. The operation of the output register 103 is then transferred to the shift mode (by the SHIFT signal), and the results of the logic operations corresponding to the respective rows of the relay ladder circuit are taken out of the output register 103 at the timing of CLOCK 2 as outputs OUT 1, OUT 2, ..., OUTn. At the termination of the logic operation, the PRESET signal is applied to the output register 103 so that the circuit is prepared for the operation of the subsequent relay ladder circuit.

We claim:

1. A programmable sequence control apparatus comprising a first memory device for storing sequence program instructions, an input/output device for introducing input data and delivering output data therethrough, a relay ladder operation device for executing logic operations for a relay ladder circuit having n rows and m columns (n and m are positive integers) in accordance with said program instructions, and a control device for delivering control signals to the relay ladder operation device, the improvement wherein said input/output device includes a second memory device for storing the addresses and the logic conditions of input/output elements, said control device includes a third memory device for storing temporarily contact data fetched out of the second memory device such that the contact data corresponding to each column can be read-out consecutively, and also for storing temporarily branch data fetched out of the first memory device such that the branch data corresponding to each column can be read out consecutively, said relay ladder operation device comprises a first shift register of a series-in and parallel-out type which receives and stores the contact data corresponding to one column j (j=1, 2, ..., m) read-out of the third memory device consecutively, a second shift register of a series-in and parallel-out type which receives and stores the branch data corresponding to said column j read-out of the third memory device, a third shift register normally operable in a parallel input/parallel output mode, the contents of which are all initially set to logic "1", and a gate circuit including logic element groups each executing logic operation for one row of said column j of said relay ladder circuit based on the parallel delivered output of said first and second shift registers corresponding to the column j and the parallel delivered output of said third shift register corresponding to the column (j−1), the results of the logic operation for said column j executed in said gate circuit replacing the contents for the column (j−1) of said third register, and said relay ladder operation device, under the control of the control device, repeats said operation for all the columns of said relay ladder circuit starting from the first column to the last column.

2. A sequence control apparatus as set forth in claim 1 wherein each of said program instructions stored in said memory device includes branch data for respective rows in each column of said relay ladder circuit.

3. A sequence control apparatus as set forth in claim 2 wherein each of said program instructions further includes an address and a code of operation, assigned to each of the input and output elements.

* * * * *